United States Patent [19]

Gregorac

[11] Patent Number: 4,704,498

[45] Date of Patent: Nov. 3, 1987

[54] CABLE CONNECTION AND CONNECTORS

[75] Inventor: Leopold Gregorac, Kranj, Yugoslavia

[73] Assignee: United Ropeworks (U.S.A) Inc., Montgomeryville, Pa.

[21] Appl. No.: 824,487

[22] Filed: Jan. 31, 1986

[51] Int. Cl.$^4$ ........................ H02G 15/02; H01R 4/10

[52] U.S. Cl. .................................. 174/79; 174/73 R; 174/89; 439/879

[58] Field of Search ......................... 174/79, 73 R, 89; 403/274, 284, 285; 339/276 T

[56] References Cited

U.S. PATENT DOCUMENTS

| | | | |
|---|---|---|---|
| 1,857,436 | 5/1932 | Cole | 403/185 |
| 2,043,341 | 6/1936 | Turechek | 174/75 R |
| 2,237,618 | 4/1941 | Weatherford | 403/275 |
| 2,347,229 | 4/1944 | Woodbury | 403/268 |
| 2,752,179 | 6/1956 | Febvre | 403/285 |
| 2,798,113 | 7/1957 | Koller et al. | 403/284 X |
| 2,968,691 | 1/1961 | Canfield | 174/113 C |
| 3,085,305 | 4/1963 | Colombet | 403/275 |
| 3,324,234 | 6/1967 | Hervig | 174/73 R |
| 3,551,882 | 12/1970 | O'Keefe | 339/276 T X |
| 3,629,488 | 12/1971 | Mixon, Jr. | 174/79 X |
| 3,683,309 | 8/1972 | Hirose | 174/113 C X |
| 3,716,894 | 2/1973 | Kingston et al. | 24/126 L |
| 3,739,457 | 6/1973 | Davis | 29/460 |
| 3,909,886 | 10/1975 | Hocke | 174/79 X |
| 4,097,686 | 6/1978 | Gladenbeck et al. | 174/113 C X |
| 4,185,161 | 1/1980 | Huang | 174/11 R |
| 4,431,861 | 2/1984 | Clabburn et al. | 174/73 R |

FOREIGN PATENT DOCUMENTS

| | | | |
|---|---|---|---|
| 663274 | 8/1965 | Belgium | 174/89 |
| 1033428 | 6/1976 | Canada . | |
| 45210 | 12/1961 | Poland | 174/89 |
| 321519 | 3/1970 | Sweden | 174/79 |

*Primary Examiner*—Morris H. Nimmo

[57] ABSTRACT

The present invention provides a connector for terminating and connecting a portion of a cable. The connector is used with a cable having a core comprising synthetic filaments, a polymeric sheath covering the core, an inner sheath comprising braided metallic filaments covering the polymeric sheath, and a polymeric outer jacket covering the inner sheath. Portions of the jacket and the inner sheath are stripped proximate the portion of a cable to be terminated to provided an exposed polymeric sheath and core portion of a first predetermined length and an exposed inner sheath portion of a second predetermined length. A generally tubular outer sleeve, having an axial length at least slightly greater than the length of exposed braided metallic filaments, is positioned so that either sleeve end extends beyond the exposed portion of the braided metallic sheath. An expansion member is disposed between the core and the exposed portion of the braided metallic sheath for expanding at least a portion of the braided metallic sheath radially outwardly to engage the outer sleeve. A sealant is preferably disposed within the sleeve for sealing the portion of the cable so terminated.

29 Claims, 11 Drawing Figures

CABLE CONNECTION AND CONNECTORS

BACKGROUND OF THE INVENTION

1. Field of the Invention

This invention relates to cable connectors and methods for making them. More specifically, this invention relates to end connectors for antenna guy cables, and in particular, to end connectors for guy cables having a fibrous aramid interior core covered with a braided metallic conductor in which the conductor is insulated from the core and the cable as a whole is insulated by an insulating sheath surrounding the conductor.

2. Brief Description of the Prior Art

Radio transmitting and receiving antennas are often large grid work structures having a height on the order of the wave length of the radio wave being transmitted or received. For a quarter wave length transmitting antenna operating in the commercial medium frequency (MF) band, an antenna having a height on the order of a hundred meters may be used. Typically, such an antenna will be a tower having a relatively small cross sectional area. The tower is supported mechanically against the effects of environmental forces by a set of guys extending radially and symmetrically to the ground or other supporting structure from various levels of the tower. Several sets of guys, each set extending from a fixed height on the tower, may be used. The guys must have substantial mechanical strength and very low stretch. Consequently, in the past, steel cables have been used. However, steel cables suffer from several disadvantages, particularly in the case of transmitting antennas. Depending on the relationship between the wavelength of the radiated wave and the length of the steel cable, a portion of the transmitted wave may be dissipated as heat in the cable or the transmitted wave may be reradiated by the cable, thus distorting the desired radiation pattern of the antenna.

Recently, cable which is practically transparent to radiowaves and which also has substantial mechanical strength and very low stretch has become available. PHILLYSTRAN (Registered Trademark of United Ropeworks (U.S.A.) Inc., Montgomeryville, PA) HPTG-TR cables are constructed of a central core rope of aramid fibers covered with an inner sheath of a synthetic plastic material, which is in turn covered by a sheath of braided metallic wire and an exterior sheath of a synthetic polymeric material (hereafter referred to a "HPTG-TR" cable). These cables are substantially lighter than steel cables and may be substituted for steel cables greatly simplifying antenna construction.

In the construction of many types of transmitting antennas, the steel guy cables must be sectioned and insulators inserted between the sections so that the sections are short in comparison with the wavelength being transmitted. In this way, the heating losses associated with the conductive sections of the cable are minimized and the resulting distortion associated with the radiating pattern of the antenna are reduced. However, such construction is expensive, in particular, when used in directional antenna systems having several towers. High frequency antennas are also sectioned, and the guys are carefully placed in an attempt to avoid the reradiation associated with the use of steel guy cables in such construction. The use of PHILLYSTRAN or other HPTG-TR-type cables eliminates the need for such sectioning.

However, in utilizing the HPTG-TR cables, there is a need for terminal connectors which permit mechanically secure connections to be made to various antenna elements. These elements include portions of the antenna tower itself, such as those which generate high electrostatic fields, as well as sections of steel cable attached at ground level. Further, there is a need for end connectors which permit the HPTG-TR cable to be protected against damage by corona discharge which may occur in areas of high electrostatic field strength, as, for example, in the vicinity of a radiating antenna. Further, when PHILLYSTRAN HPTG-TR cables are used as elements of wire antennas, the connectors must be adaptable for conducting radiofrequency waves to the cable from a transmitter source.

The present invention provides connectors and methods for forming connectors on cables which have a core comprising synthetic filaments encased in an inner sheath of braided metallic filaments and an outer sheath of synthetic polymeric material.

Cable connectors for mechanically securing the ends of such cables under both relatively high and relatively low tension conditions, and methods for making such cable connectors are taught. Further, connectors for mechanically securing the ends of such cables under high electrostatic field conditions and methods for constructing such connectors are disclosed. In addition, connectors for electrically connecting such cables to sources of radiofrequency energy and methods for making such connectors are given.

The present invention provides connectors for HPTG-TR cable which permit the cable to be mechanically secured. The connectors also permit electrical connection to be made to the conductive portion of the cable without reducing the mechanical strength of the core of the cable. The connectors also prevent the penetration of moisture into the interior of the cable. The connectors also advantageously provide contact to the conductive portion of the cable which is at least as conductive as the conductive portion of the cable itself.

The connectors also provide a means for supplying high frequency electromagnetic energy to the conductive portion of the cable so that the cable may be used in constructing high frequency radiowave transmitting antennas. The connectors also advantageously reduce the likelihood that either corona discharge or an intensive radiated electric field will damage or destroy the structural core of the cable.

Depending on the mechanical tension which is to be applied to the cable and the intensity of the electrical field to which the cable is to be subjected, the present invention takes on a number of different embodiments. For example, when it is desired to connect the end of a cable which is subject to relatively low mechanical tension and a relatively low power electrical field, a first embodiment of the present invention described below may be used. By relatively low mechanical tension is meant up to about forty percent of the breaking strength of the cable. By relatively low electrical power is meant an electrostatic field having about thirty percent of the expected corona voltage of the cable. On the other hand, when the cable is to be subject to high mechanical tension and an electrical field having a high power, the third embodiment described below may be used. By high mechanical tension is meant about one hundred percent of the breaking strength of the cable or greater. By high power electrical field is meant more than one hundred percent of the expected corona voltage of the cable.

When structural considerations dictate that the conductive portion of the cable be terminated in the presence of a high electrical field but that the insulating non-conductive core of the cable be continued, as when the cable is used as a portion of a high frequency radio transmitting antenna, the second connector embodiment described below may be used.

Amateur radio transmitting antennas may be constructed using HPTG-TR cable and the connectors of the second embodiment described below. For example, a half wave dipole antenna may be constructed by stringing a section of HPTG-TR cable of appropriate length horizontally. The outer polymeric jacket and the inner braided conductor are removed from either end and from a section of the middle of the length of HPTG-TR cable giving two conductive sections. For example, for an antenna transmitting at about 29 megahertz, the total length of the radiating dipole including both of the conductive sections must be about five meters. Both of the conductive sections are terminated at either end using connectors of the second embodiment described below Clamps are attached to both of the interior connectors and are used to feed the antenna with radiofrequency energy. The nonconductive core at the ends of the HPTG-TR cable may be connected with lengths of another nonconductive structural rope or cable, such as nylon rope, to support the antenna.

In general, the electrically conductive portions of the connectors described herein are formed from metal, preferably aluminum. However, other electrically conductive materials may be employed. Aluminum is preferred because the metallic braided inner conductive sheath of PHILLYSTRAN HPTG-TR cable is aluminum, and consequently the same material is preferred as it has the same conductivity as the inner conductive sheath, junction potentials are avoided, etc. Other conductive materials, such as copper, or stainless steel may also be used. However, the material must be chosen so that the electrical conductivity and mechanical strength of the connector formed are not significantly diminished.

Similarly, the various members used to expand the inner sheath of braided metallic filaments and to expand the filaments of the aramid core may be made from aluminum. Expansion members used to expand the core filaments are preferably solids, such as solid aluminum. The electrically conductive clamp used to electrically connect the braided metallic inner sheath may be stainless steel.

SUMMARY OF THE INVENTION

The present invention provides a connector means for terminating and connecting at least the conductive portion of a cable. The connector is used with a cable having a core comprising synthetic filaments, a polymeric sheath covering the core, an inner sheath comprised of braided metallic filaments covering the polymeric sheath, and a polymeric outer jacket covering the inner sheath, portions of the jacket and the inner sheath being exposed proximate the portion of a cable to be terminated to provide an exposed polymeric sheath and core segment of a first predetermined length and an exposed inner sheath segment of a second predetermined length. The connector included a generally tubular outer sleeve having an axial length at least slightly greater than the second predetermined length, the sleeve being positioned so that either sleeve end extends beyond the exposed segment of the braided metallic sheath. Expansion means are disposed between the core and the exposed segment of the braided metallic sheath for expanding at least a portion of the braided metallic sheath radially outwardly to engage the outer sleeve. Sealing means are preferably disposed within the sleeve for sealing the segment of the cable so terminated.

In one of the preferred embodiments, the exposed segment of the polymeric sheath and core extends beyond the sleeve. In other preferred embodiments, the exposed portion of the polymeric sheath is stripped from the exposed segment of the polymeric sheath and core to provide an exposed core segment. The exposed core segment terminates within the sleeve. In the latter embodiments a spacer member is disposed within the exposed portion of the core for expanding a portion of the synthetic filaments radially outwardly to engage the sleeve.

The present invention also provides a method for forming such connectors.

BRIEF DESCRIPTION OF THE DRAWINGS

For the purpose of illustrating the invention there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
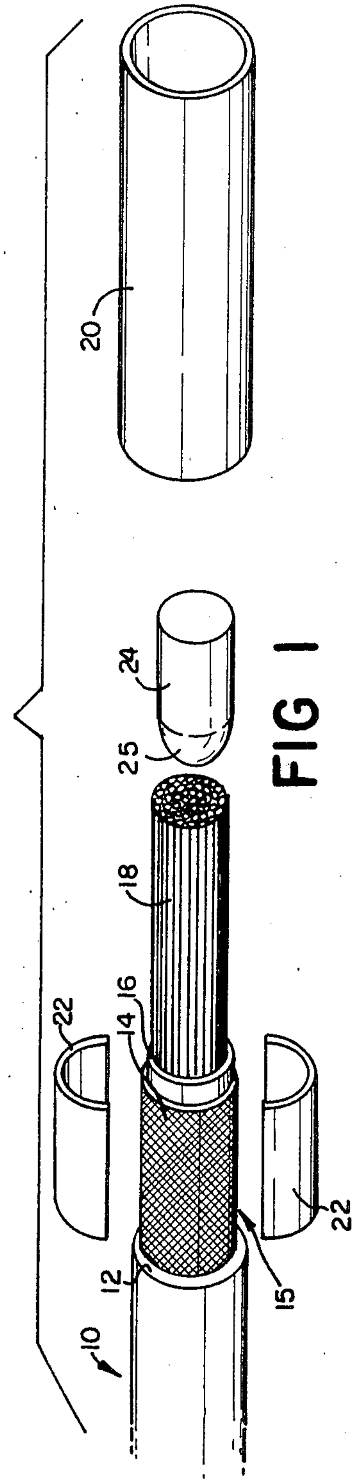
FIG. 1 is an expanded perspective view of the components used in making a first illustrated embodiment of the present invention.
Figure 2:
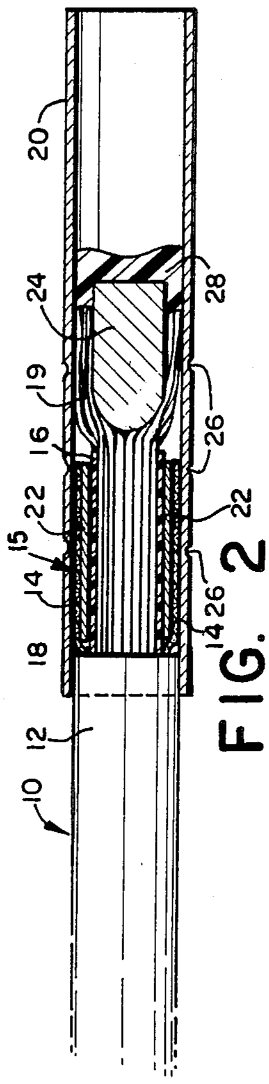
FIG. 2 is a cross sectional view of the cable connector of FIG. 1.

Referring now to the drawings, in all of which like elements are designated by like reference numerals, and referring particularly to FIGS. 1-4, in a first illustrated embodiment, the present invention comprises a method for terminating a cable and the cable connector 11 so formed.

The cable 10 is illustrated in FIG. 1. The core 18 is preferably composed of a bundle of synthetic filaments, preferably aramid or other suitable high strength nonconductive fibers, and preferably strands of aramid fibers twisted into a rope. The strands themselves may consist of individual substrands of such fibers and such substrands may be twisted to form the strands.

Encasing the core 18 is sheath 16 which is preferably formed of a synthetic polymeric material such as olefin copolymer, but which may be formed of any other suitable nonconductive material.

Encasing the core 18 and the synthetic polymeric sheath 16 is a conductive inner sheath 14 of braided metallic filaments. The braided metallic filaments are preferably formed from aluminum wire but may be formed of any other electrically conductive material such as copper, steel, etc.

Encasing the conductive braided inner sheath 14 is an insulating outer jacket 12 which is preferably formed from a synthetic polymeric material such as olefin copolymer, but which also may be formed from any other suitable nonconductive material.

In forming the terminal end connector 11, the cable 10 is threaded into and through a generally cylindrical or tubular outer sleeve 20. The sleeve 20 is preferably formed of a light weight metallic material such as aluminum. Preferably the inner diameter of the sleeve 20 is substantially the same as or slightly less then the outer diameter of the outer jacket 12 to provide a tight fit. Prior to or preferably subsequent to threading the end of the cable 10 through the outer sleeve 20, a segment of the outer jacket 12 is stripped from the cable end to expose an initial terminal segment of the inner sheath 14. Preferably, the outer jacket 12 is stripped after the sleeve 20 has been pulled over the cable end because stripping the outer jacket 12 may cause the braided inner sheath 14 to expand radially outward to some extent, making insertion of the cable end into and through the sleeve 20 more difficult. Subsequently, a segment of the inner sheath initial terminal segment and the polymeric sheath 16 is stripped to expose a terminal segment or portion of the core 18 of the cable. The exposed terminal core segment has a first predetermined length while the remaining exposed segment or portion 15 of the inner sheath 14 has a second predetermined length.

A portion of the exposed braided metallic filaments of the inner sheath 15 is expanded radially outwardly by inserting expansion means between the core 18 and the exposed inner sheath 15. In the present embodiment, the expansion means is an axially split generally cylindrical member 22. However, the expansion means could comprise a tapered cylinder (not shown), or a partially split cylinder (not shown) or any other similarly shaped component adapted to be positioned between the inner core 18 and the exposed inner sheath 15 for expanding the exposed inner sheath 15 radially outwardly. Preferably, the expansion means 22 is inserted between the sheath of synthetic polymeric material 16 and the exposed inner sheath 15 of braided metallic filaments.

Next, the exposed portion 15 of the inner sheath 14 and the exposed terminal core segment 18 are covered with the tubular sleeve 20 by moving the cable end and the sleeve 20 relative to each other. It is preferred that the inside diameter of the sleeve 20 be chosen so that the sleeve fits snugly over the expanded segment of exposed inner sheath 15. The length of the sleeve 20 is at least slightly greater than the sum of the respective second and first predetermined lengths of the remaining exposed inner sheath 15 and the terminal core segment 18. The sleeve 20 is positioned so that a portion of one end of the sleeve extends beyond the end of the terminal core segment 18 and a portion of the other end of the sleeve extends beyond the exposed portion of the inner sheath 14 and around a portion 15 of the outer jacket 12 (best seen in FIG. 2).

A spacer member 24 is inserted into the sleeve 20 to expand a portion of the exposed filaments 19 of the core 18 radially outwardly to engage the inner surface of the sleeve 20 to provide a secure, high strength mechanical connection of the core fibers to the connector. In the presently preferred embodiment, the spacer member 24 is generally bullet-shaped and includes a generally solid cylindrical body with a radially symmetric or conical tip 25. The tip 25 helps to separate and spread the filaments 19 of the exposed portion of the core 18 as the spacer member 24 is installed. It will be appreciated by those skilled in the art that the spacer member 24 may be formed of any other suitable shape and, if desired, may comprise a generally hollow or solid body.

After the spacer member 24, which may be made from a metallic material such as aluminum or any other high strength material, is inserted to expand the filaments 19 of the terminal core segment radially outwardly to engage the sleeve 20, spaced portions of the sleeve 20 are pressed radially inwardly to further engage and grip the expanded core filaments 19 and the expanded portion of the exposed inner sheath 15 to help secure the sleeve 20 to the cable 10 and to secure the fibers of the core 18 within the connector 11. The indentations 26 are easily formed with a tool (not shown) especially adapted for this purpose. For example, a rotary crimping tool such as a ROTACRIMP handtool or the like (not shown) may be used. In the embodiment illustrated in FIG. 2 and FIG. 4, the sleeve 20 is pressed radially inwardly at a plurality of circumferentialy and axially spaced positions to create a plurality of spaced, inwardly extending protrusions or lugs 26 which engage and grip the expanded inner sheath 15 and the expanded core filaments 19.

The distal end of the cable is then sealed to prevent moisture from entering the sleeve 20 by sealing at least the space between the spacer member 24 and the sleeve 20. A sealing means comprising a synthetic polymeric sealant 28 is applied to the end of the spacer member 24 inside the tubular sleeve 20. The synthetic polymeric sealant 28 may be a moisture-curable silicone rubber sealant or any other suitable moisture resistant sealant.

Figure 3:
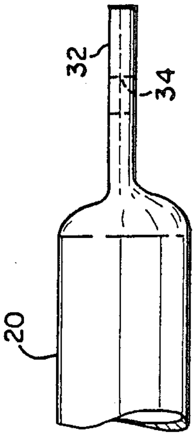
FIG. 3 is a top view of a portion of the connector of FIG. 1.
Figure 4:
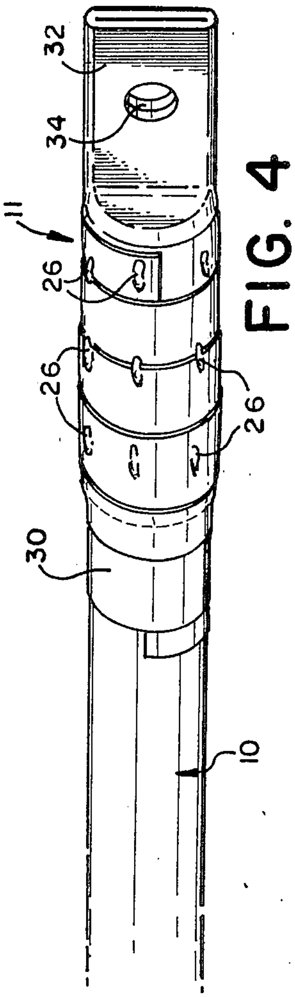
FIG. 4 is a perspective view of the connector of FIG. 1.

As illustrated in FIG. 3 and FIG. 4 the distal portion of the one end of the sleeve 20 extending beyond the spacer member 24 is pressed inwardly from two opposed sides to form a generally planar lug 32. The sleeve portion may be pressed inwardly using a vise or pliers (not shown) or any other suitable tool. The lug 32 is used to mechanically attach the cable 10 to other structure, for example a clevis-type connector (not shown) for an antenna. A hole 34 may be made extending through the lug 32 and a pin or bolt (not shown) may be inserted through the hole 34 to attach the cable 10 to an anchored clevis (not shown).

The other end of the sleeve 20 is preferably sealed by wrapping the outer jacket 12 of the cable proximate the sleeve 20 and at least a portion of the sleeve 20 proximate the outer jacket 12 with tape 30. The tape 30, which preferably is cold vulcanized tape, is preferably wrapped in an overlapping spiral manner as shown in FIG. 4.

The connector of this embodiment is useful when an end of the cable is to be mechanically secured and a relatively low power electrical field is to be carried by the cable.

Figure 5:
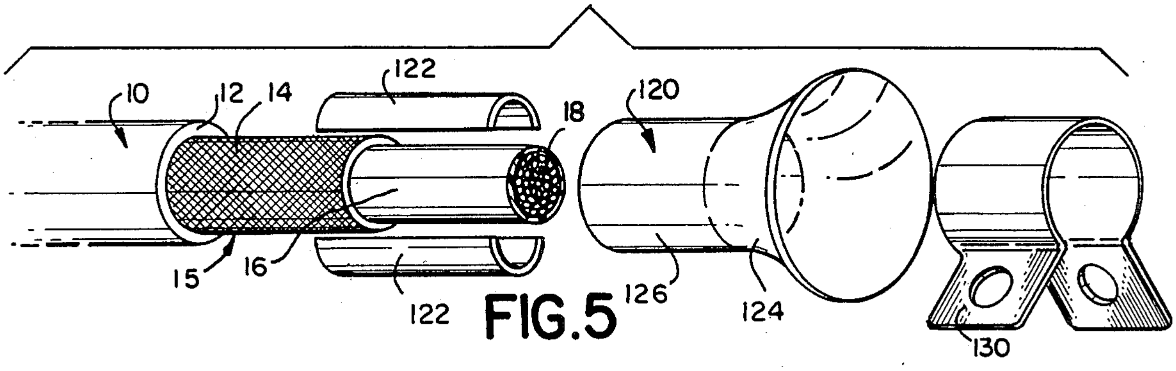
FIG. 5 is an exploded perspective view of a second embodiment of the present invention.
Figure 6:
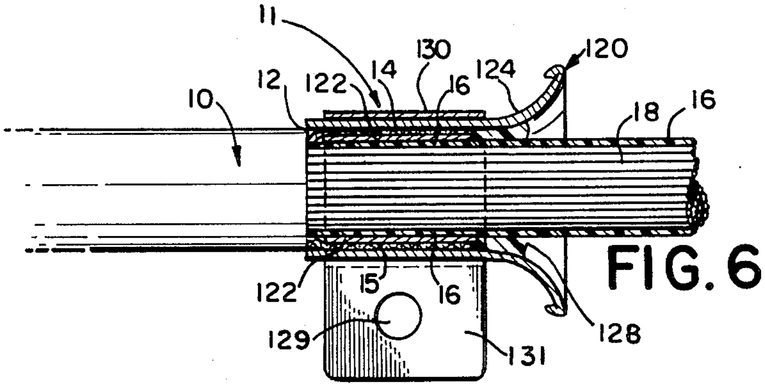
FIG. 6 is a cross-sectional view of the connector of FIG. 5.
Figure 7:
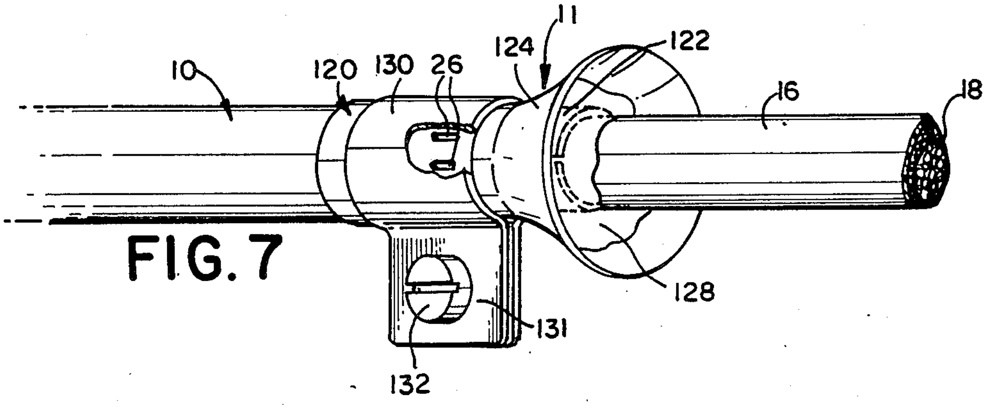
FIG. 7 is a perspective view of the connector of FIG. 5.

Referring now to FIG. 5-7, there is illustrated a second embodiment of the invention wherein the electrically conductive portion 14 of the cable 10 is terminated while the non-conductive core 18 is not. In this embodiment the cable 10 is threaded through a tubular sleeve 120. The sleeve 120 has a generally cylindrical body 126 and a bell mouth end 124 extending radially outwardly.

The cable 10 is threaded through the sleeve 120. A segment of outer jacket 12 is stripped from the cable 10 proximate the bell mouth end 124 of the sleeve 120 to expose a segment of the inner sheath 14. Next, a segment of the inner sheath 14 is stripped to expose a segment of the core 18 and polymeric sheath 16 having at least a first predetermined length, wherein the remaining length of the exposed inner sheath segment 15 is less than the length of the sleeve 120 and constitutes a second predetermined length.

As in the case of the first illustrated embodiment, the expansion means employed in the present embodiment is a split generally cylindrical member 122. Similarly, the expansion means could comprise a tapered cylinder (not shown), a partially split cylinder (not shown), or the like. A portion of the exposed inner sheath 15 is radially expanded by inserting the split cylindrical member 122 between the sheath of synthetic polymeric material 16 and the exposed inner sheath 15. The exposed inner sheath segment 15, and an immediately adjacent portion of the exposed polymeric sheath 16 and core 18, is then covered with the sleeve 120 by moving the sleeve 120 and the cable 10 relative to each other.

Spaced portions of the cylindrical body 126 of the sleeve 120 are then pressed radially inwardly to engage and grip the expanded inner sheath 15 and the generally annular space within the sleeve 120 proximate the end of the expanded inner sheath segment 15 is sealed with a sealing means, preferably a synthetic polymeric sealant 128, thereby sealing the cable 10 from moisture.

In the preferred embodiment illustrated in FIG. 6 a clamp member 130 preferably formed from steel is then installed around the exterior surface of the cylindrical portion of the sleeve 120 to provide an electrical connection to the inner sheath 14 of the cable 10. The clamp member 130 includes a generally planar lug 131 with a hole 129 extending therethrough for connecting the connector 11 to another cable or to other structure (not shown) utilizing a fastener means such as a screw 132. When the cable 10 is used as a portion of a radiofrequency transmitting antenna, radiofrequency energy is applied through clamp 130 to the inner sheath 14 of braided metallic filaments of the inner sheath 15 of the cable 10.

The exposed portion of the core 18 covered with the polymeric sheath 16 extending beyond the sleeve 120 may be clamped, tied, or otherwise affixed to provide mechanical support for the cable (not illustrated).

In addition, the sleeve 120 is bound to the outer jacket 12 of the cable 10 by wrapping tape, such as cold vulcanized tape, around the outer jacket 12 and at least the generally cylindrical segment 126 of the sleeve 120. Alternatively, a synthetic polymeric sealant may be applied between the outer jacket 12 of the cable 10 and the generally cylindrical segment of the sleeve 120.

The connector of this second embodiment is used to terminate the electrically conductive portion of the HPTG-TR cable while permitting the core covered by the polymeric sheath to be extended further. The clamp may be used to connect a source of electrical power to the conductive inner sheath of the cable, as, for example, when the cable forms a portion of radiofrequency transmitting antenna. The exposed core covered by the polymeric sheath may be mechanically secured near its terminus to provide mechanical support for the cable. Alternatively, the exposed core covered by the polymeric sheath may extend for only a relatively short distance, the subsequent segment of the cable being encased with another segment of conductive inner sheath. This arrangement may occur, for example, when a segment of cable is used as a dipole transmitting antenna (not illustrated). A segment of inner sheath is removed in the middle of the cable to expose the core covered by polymeric sheath and a pair of connectors of the second embodiment described above are formed to terminate the two resulting segments of conductive cable proximate the non-conductive core segment. Radiofrequency power is applied to either of the conductive segments through the conductive clamps.

Figure 8:
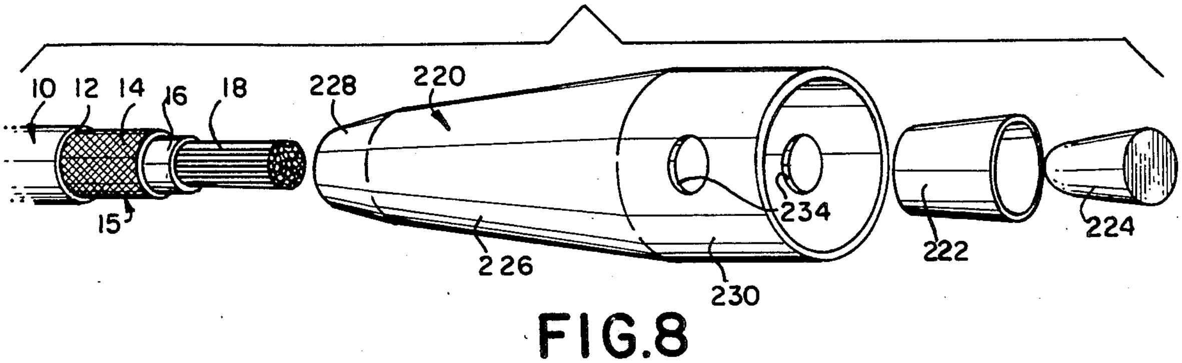
FIG. 8 is an exploded perspective view of a third embodiment of the present invention.

A third embodiment of the invention is illustrated in FIG. 8-11. In this embodiment a cable end is threaded in and through a generally tubular sleeve 220. Referring now to FIG. 8, the tubular sleeve 220 has a generally cylindrical segment 230 at one end, a generally truncated conical segment 226, and another relatively short beveled segment 228 at the other end of the sleeve 220. The relatively short terminal beveled segment 228 has a greater cone angle then conical segment 226; that is, the tip 228 of the sleeve 220 is beveled or tapered. The sleeve segments are arranged such that the diameter of the cylindrical segment 230 is substantially the same as the largest diameter of truncated conical segment 226, and the smallest diameter of the truncated conical segment 226 is the same as the largest diameter of beveled segment 228.

In assembling the connector 11, the cable end is threaded into and through the sleeve 220 such that a length of cable 10 extends beyond the sleeve 220. Next, a segment of the outer jacket 12 is stripped from the cable 10 to expose an initial terminal segment of the inner sheath 14.

A segment of inner sheath 14 and the synthetic polymeric sheath 16 is stripped away to expose a terminal segment of the aramid fiber core 18 having a first predetermined length. The remaining exposed inner sheath 15 of braided metallic filaments has a second predetermined length. The filaments of the exposed core are bound with thread (not illustrated) to prevent fraying of the filaments.

The cable 10 is moved relative to the tubular sleeve 220 so that the sleeve 220 covers the exposed inner sheath 15 and the exposed core segment 18. The length of sleeve 220, is greater than the sum of the lengths of the remaining exposed inner sheath 15 (second predetermined length) and the terminal core segment 18 (first predetermined length). The sleeve 220 is positioned (shown in FIG. 10) such that a portion of one end of the sleeve 220 extends beyond the end of the terminal core segment 18 and a portion of the other end of the sleeve 220 extends beyond the exposed inner sheath 15 and around a portion of the outer jacket 12 of the cable 10.

A portion 15 of the exposed inner sheath 14 is then expanded radially by inserting expansion means, in this embodiment a hollow, truncated, expansion cone 222 between the polymeric sheath 16 and the inner sheath 14 by means of a generally tubular insertion tool 250. Preferably, the expansion cone 222 is inserted between the inner sheath 14 of braided metallic filaments and the synthetic polymeric sheath 16. The expansion cone 222 is held in place on the end of the insertion tool by press-fitting the expansion cone 222 onto the end of the insertion tool 250. The insertion tool 250 permits force to be applied against the end of the expansion cone 222, such as by striking the end of the expansion tool 250 with a hammer 300 as illustrated in FIG. 9.

Figures 9, 10, 11:
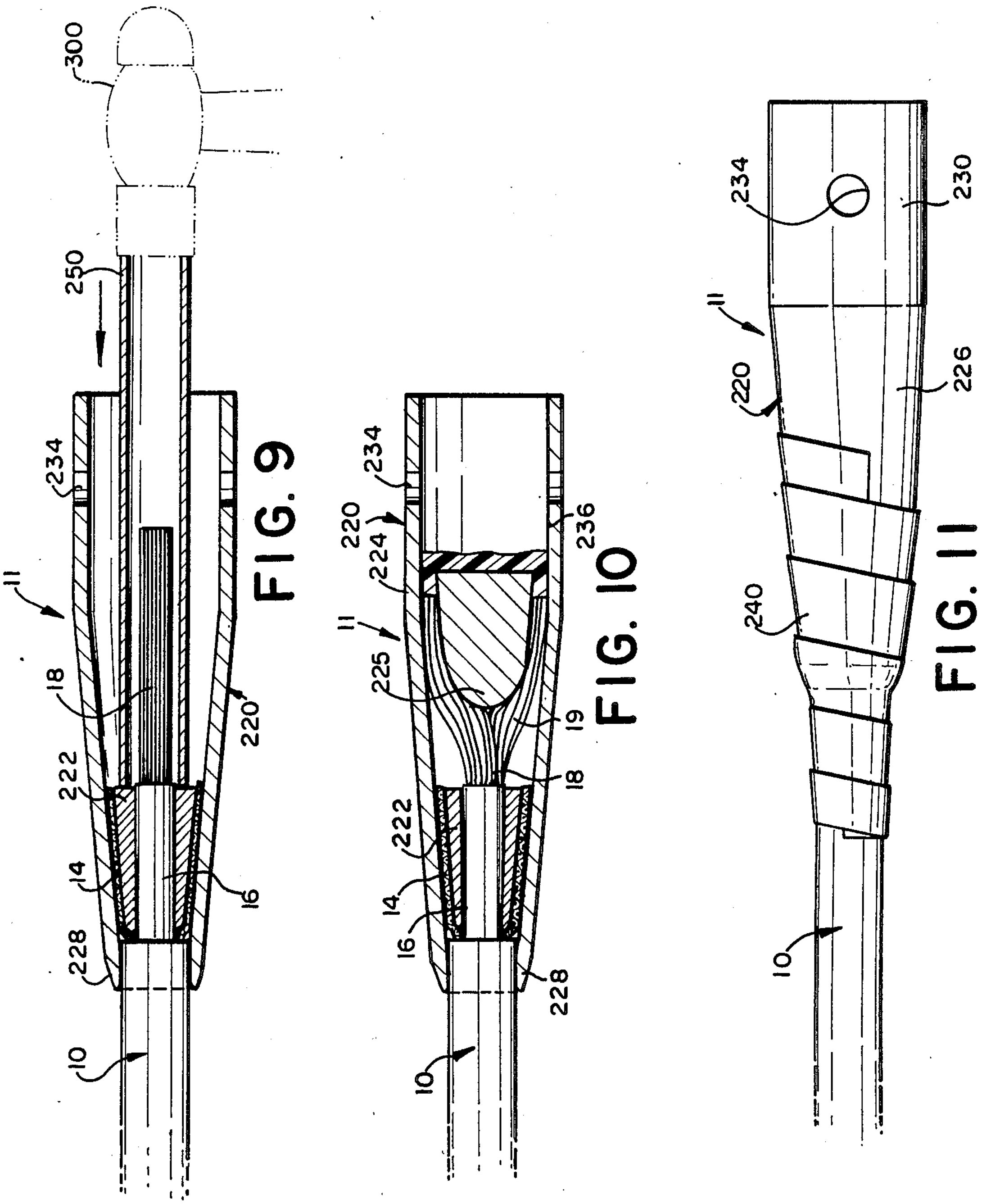
FIG. 9 is a cross-sectional view of the connector of FIG. 8 showing the placement of a conical expansion member.
FIG. 10 is a cross-sectional view of the connector of FIG. 8.
FIG. 11 is an elevational view of the connector of FIG. 8.

The thread (not illustrated) binding the filaments of the exposed core 18 is removed, and a spacer member 224 (substantially the same as spacer member 24) inserted into the sleeve 220 to expand the filaments 19 of the core 18 radially outwardly to engage the sleeve 220, as illustrated in FIG. 10. A high strength mechanical connection of the core fibers to the connector 11 is thereby provided. The cable end is sealed with sealing means comprising a synthetic polymeric material 236 applied in the space between the spacer 224 and the sleeve 220.

Finally, the sleeve is bound to the outer jacket 10 by wrapping cold vulcanized tape 240 around the outer jacket 10 proximate the sleeve 220 as illustrated in FIG. 11. The sleeve 220 has a pair of holes 234 in the cylindrical segment, these holes may be used to mechanically secure the cable 10 and terminal connector 11 to other structure (not shown).

This third embodiment is useful to terminate a cable when high mechanical tension and high electrical power are to be applied to the cable through the connector.

From the foregoing description, it can be seen that the present invention comprises a method for forming a connector on an HPTG-TR type cable and a connector so formed. It will be recognized by those skilled in the art that changes may be made to the above-described embodiment of the invention without departing from the broad inventive concepts thereof. It is understood, therefore that this invention is not limited to the particular embodiment disclosed, but it is intended to cover all modifications which are within the scope and spirit of the invention as defined by the appended claims.

I claim:

1. A terminal connection for an end of a cable comprising:

- a cable having a core comprising synthetic filaments, a polymeric sheath covering said core, an inner sheath comprising braided metallic filaments covering said polymeric sheath, and a polymeric outer jacket covering said inner sheath, successive end portions of said inner sheath, said polymeric sheath, and said core being exposed proximate one end of the cable being terminated to provide exposed polymeric sheath and core segments together having a first predetermined length, and an exposed inner sheath segment of a second predetermined length;
- a generally tubular outer sleeve surrounding the one end of the cable to be terminated, said sleeve having an axial length at least slightly greater than the sum of the first and second predetermined lengths, said sleeve positioned so that one axial end extends axially beyond the exposed portion of the braided metallic sheath and a remaining axial end extends beyond said one end of the cable;
- expansion means disposed between said core and said exposed portion of said braided metallic sheath for expanding at least a portion of said braided metallic sheath raidally outwardly to engage said outer sleeve; and
- a spacer member disposed within the exposed end portion of the core for expanding at least a portion of the synthetic filaments radially outwardly to engage said outer sleeve.

2. A terminal connection according to claim 1 for terminating the end of a cable, wherein

- the outer sleeve is generally cylindrical and further comprising
- sealing means disposed proximate the spacer member and within the sleeve for sealing said end of the cable, the sleeve including radially inwardly extending protrusions for gripping the inner sheath and the core filaments, said remaining axial end of the sleeve being formed into a generally planar lug with an opening extending therethrough.

3. A terminal connection according to claim 2 wherein said spacer member comprises a generally cylindrical body having a radially symmetric tip, said tip being oriented toward said other end of said sleeve such that during installation of the spacer member said tip separates and expands said core filaments.

4. A terminal connection according claim 3 wherein said tip is generally conical.

5. A terminal connection according to claim 3 wherein said spacer member is bullet-shaped.

6. A terminal connection according to claim 2 wherein said expansion means comprises a generally cylindrical member.

7. A terminal connection according to claim 6 wherein said cylindrical member is axially split into at least two elements.

8. A terminal connection according to claim 2 wherein said sealing means comprises a synthetic polymeric sealant.

9. A terminal connection according to claim 8 wherein said synthetic polymeric sealant is a moisture-curable silicone sealant.

10. A terminal connection according to claim 1 for the end of a cable, wherein

- the outer sleeve has a generally cylindrical segment on the one axial end and a generally conical segment on the remaining axial end, and is positioned so that the generally cylindrical segment extends beyond the one end of the cable and the generally conical segment of the sleeve extends beyond the exposed portion of the braided metallic sheath and further comprising
- sealing means disposed proximate the spacer member and within said cylindrical end of the sleeve for sealing the end of the cable, said cylindrical end of said sleeve being formed into a clevis.

11. A terminal connection according to claim 10 wherin said conical segment of said sleeve is sealed with synthetic polymeric sealant.

12. A terminal connection according to claim 11 wherein said synthetic polymeric sealant is a moisture curable silicone rubber sealant.

13. A terminal connection according to claim 10 additionally comprising cold vulcanized tape wrapped around said outer jacket of said cable and at least the non-cable terminated end of said sleeve.

14. A terminal connection according to claim 10 wherein the annular space between said spacer and said sleeve is sealed with a synthetic polymeric material.

15. A terminal connection according to claim 14 wherein said synthetic polymeric material is a moisture-curable silicone rubber sealant.

16. A terminal connection according to claim 14 wherein said spacer member comprises a geneally cylindrical body having a radially symmetric tip, said tip being oriented toward said other end of said sleeve such that during installation of the spacer member said top separates and expands said core filaments.

17. A terminal connection to claim 10 wherein said tip is generally conical.

18. A terminal connection according to claim 10 wherein said spacer member is bullet-shaped.

19. A terminal connector device for terminating an end portion of a cable including a core formed by a first multiplicity of filamenets, a tubular sheath surrounding the core and formed by a second multiplicity of braided filaments, and an outer tubular jacket surrounding the tubular sheath and core, comprising:

spacer means for radially expanding a first multiplicity of filaments forming a cable core;

expansion means for positioning between a multifilament core and a tubular sheath formed by a second multiplicity of braided filaments surrounding a multifilament core of a cable for radially expanding the braided filaments forming the tubular sheath of such cable from the core surrounded by the tubular sheath of such cable; and tubular outer sleeve menas sized sufficiently for receiving and covering the spacer means and the expansion means when the spacer means and expansion means are axially adjoining and for securing a first multiplicity of filaments forming a core of a cable with the spacer means and a second multiplicity of braided filaments forming a tubular sheath surrounding such cable core with the expansion means.

20. The device of claim 19 wherein said tubular outer sleeve is generally cylindrical.

21. The device of claim 20 wherein said expansion means comprises a pair of semi-circular cylinder halves.

22. The device of claim 20 wherein said tubular outer sleeve means has a generally cylindrical segment at one axial end and a generally conical segment at a remaining axial end.

23. The device of claim 22 wherein said conical segment has a sidewall and said sidewall tapers down in thickness at said remaining axial end forming a beveled tip.

24. The device of claim 22 wherein said spacer means has a substantially truncated conical shape.

25. The device of claim 24 wherein said spacer means has a bore of substantially uniform diameter and a bevelled outer end surface at a smaller axial end of the conical shape.

26. A connection for a multicomponent cable comprising:

a cable including a core formed by a first multiplicity of filaments, an inner tubular sheath formed by a second multiplicity of filaments surrounding said core, and an outer tubular jacket surrounding said core and inner tubular sheath, axial portions of said core and said inner tubular sheath being exposed proximate one another on the cable;

a tubular outer sleeve surrounding said cable and the proximate, exposed axial portions of said inner tubular sleeve and said core, the tubular outer sleeve having axial ends extending beyond the proximate, exposed axial portions of the core and of the inner tubular sheath;

spacer means disposed within said exposed axial portion of the core and within said tubular outer sleeve for expanding said first multiplicity of filaments raidally outwardly for engagement with said tubular outer sleeve; and expansion means disposed between said core and said inner tubular sheath and within said tubular outer sleeve for expanding at least a portion of said second multiplicity of filaments forming said inner tubular sheath radially outwardly for engagement with said tubular outer sleeve.

27. The connection of claim 26 further comprising:

sealing means disposed proxiamte the spacer means and within the tubular outer sleeve for sealing said exposed portions of the cable.

28. The connections of claim 26 wherein the filaments of said first multiplicity are polymeric.

29. The connection of claim 26 wherein said proximate, exposed axial portions of the inner tubular sleeve and core are at one axial end of the cable and said one end of the tubular outer sleeve extends beyond said one end of the cable and includes a transverse bore therethrough.

* * * * *